United States Patent [19]
Winnen

[11] 3,984,206
[45] Oct. 5, 1976

[54] APPARATUS FOR THE COMBUSTION OF HALOGENATED HYDROCARBONS

[75] Inventor: Denis F. Winnen, Rotterdam, Netherlands

[73] Assignee: Shell Oil Company, Houston, Tex.

[22] Filed: May 6, 1974

[21] Appl. No.: 467,532

[30] Foreign Application Priority Data
May 4, 1973 United Kingdom............... 21309/73

[52] U.S. Cl. ............................... 23/262; 23/277 R; 165/128; 423/481
[51] Int. Cl.[2] ......................................... B01J 1/00
[58] Field of Search ............. 23/277 R, 277 C, 262; 432/72, 223; 126/116 B, 116 R; 423/481; 165/128

[56] References Cited
UNITED STATES PATENTS

| | | | |
|---|---|---|---|
| 1,995,647 | 3/1935 | Pier et al. .......................... 23/252 A |
| 2,376,171 | 5/1945 | Mueller....................... 126/116 R X |
| 2,545,314 | 3/1951 | Seebold .............................. 423/481 |
| 3,140,155 | 7/1964 | Cull et al. .......................... 23/277 R |
| 3,273,621 | 9/1966 | Childree ......................... 432/223 X |
| 3,362,902 | 1/1968 | Kivlen et al..................... 23/262 UX |
| 3,380,410 | 4/1968 | Venable, Jr........................ 23/277 R |
| 3,445,192 | 5/1969 | Woodland et al................ 23/277 R |
| 3,463,467 | 8/1969 | Nesbitt................................ 432/223 |
| 3,737,287 | 6/1973 | Churchill et al. ..................... 23/281 |
| 3,789,109 | 1/1974 | Lyon et al........................... 423/481 |
| 3,815,671 | 6/1974 | Turner............................. 165/128 X |

FOREIGN PATENTS OR APPLICATIONS
1,070,515 6/1967 United Kingdom

*Primary Examiner*—Joseph Scovronek
*Assistant Examiner*—Arnold Turk

[57] ABSTRACT

A process and apparatus for combusting halogenated organic materials wherein such materials are combusted at a temperature of at least 600°C in a refractory-lined furnace, the combustion gases formed are cooled and the acid constituent(s) thereof are subsequently stripped by contact with an aqueous liquid, the furnace being externally cooled such that the temperature of its metal casing lies between 140°C and 375°C thereby minimizing corrosion of the casing.

4 Claims, 2 Drawing Figures

APPARATUS FOR THE COMBUSTION OF HALOGENATED HYDROCARBONS

BACKGROUND OF THE INVENTION

1. Field of the Invention

The present invention relates to a process and an apparatus for the combustion and subsequent disposal of halogenated hydrocarbons.

2. The Prior Art

The disposal of halogenated organic materials formed as waste products in industrial halogenation processes give rise to difficult pollution problems. Since halogenated organic materials possess varying degrees of toxicity to plant and animal life, it is not desirable to dispose of them on land or at sea, and since their combustion products contain halogens and halogen acids which pollute the air, they are not suitably disposed of by using normal incineration techniques.

It has previously been proposed to combust halogenated organic materials in a refractory-lined furnace at elevated temperature, cool the hot combustion gases formed, remove the halogen acid components thereof and then discharge the remaining components of the gases to the atmosphere. Czekay et al. in British Pat. No. 1,070,515 discloses a controlled combustion process with subsequent hydrogen chloride recovery. Cull et al. in U.S. Pat. Nos. 3,140,155 and 3,220,798 disclose a process and furnace apparatus capable of combusting halogenated organic residue materials to recover hydrogen halide therefrom. One of the difficult technical problems involved in combustion process is that the hot halogen acid-containing combustion products penetrate the refractory lining of the furnace and come into contact with the steel casing causing it to corrode. This eventually leads to a failure of the steel casing which results in shut downs in order to make the necessary repairs or replacements which, of course, are both expensive and time consuming. A proposed solution to this problem is to construct the casing from a special acid-resistant alloy steel. This, however, has a disadvantage in that it is expensive and moreover is not entirely satisfactory because even such alloy steels corrode to a certain extent in the presence of hot halogen acids.

It is, therefore, an object of the present invention to provide a process for the disposal of halogenated organic materials which does not create pollution and does not suffer from the above-mentioned disadvantages. A further object is to provide a reliable process for the combustion of halogenated organic materials in a furnace the steel casing of which is not significantly corroded by the hot halogen acid-containing combustion gases.

SUMMARY OF THE INVENTION

The present invention relates to a process for the combustion and recovery of halogenated organic materials wherein such materials are combusted at a temperature of at least 600°C in a refractory-lined metal furnace, or combustion chamber. The combustion gases thereby formed are cooled and the acid constituent(s) thereof removed by contact with an aqueous liquid to produce an aqueous acid solution which is recovered, and cooled, acid-free gases which are discharged to the atmosphere. The furnace is externally cooled such that the temperature of its metal casing lies between 140°C and 375°C. The operation of the furnace in the aforementioned temperature range minimizes the corrosion of the metal furnace casing by the halogen acid constituents.

DESCRIPTION OF THE PREFERRED EMBODIMENTS

Figure 1:
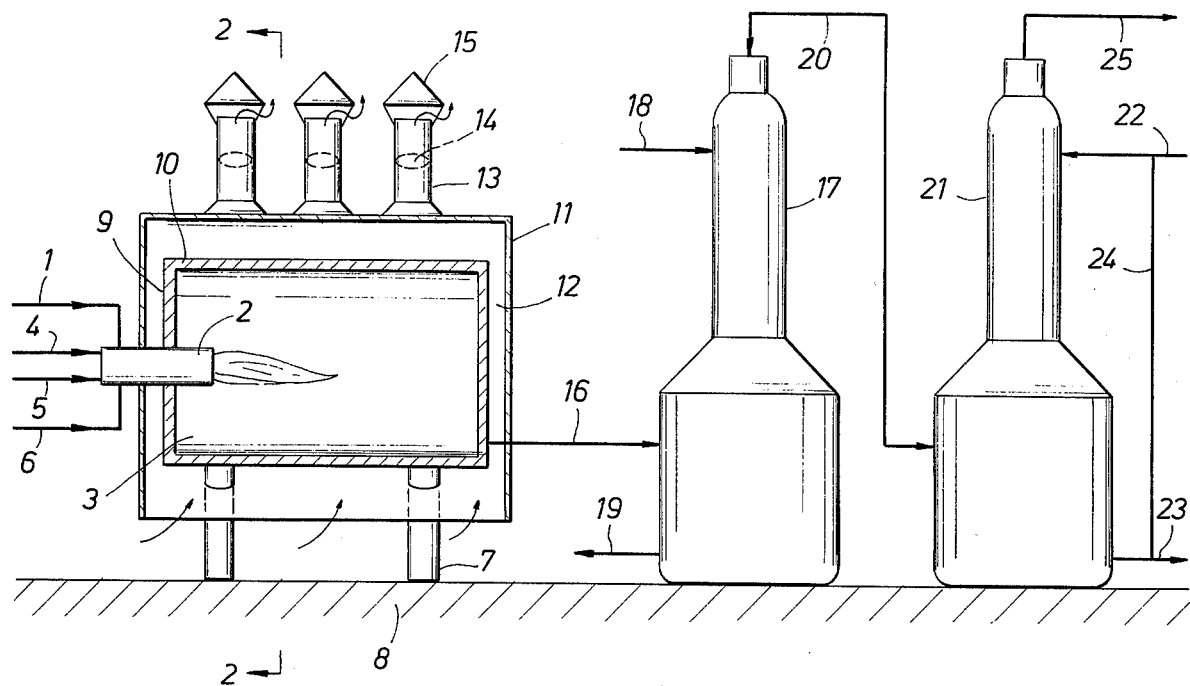
FIG. 1 shows a partially schematic view of the process and apparatus of this invention in which halogenated organic materials are suitably combusted.

The apparatus suitable for carrying out the process described herein comprises a. a refractory-lined metal furnace or combustion zone having one or more inlets for the introduction of halogenated organic material, oxygen-containing gas, fuel and/or hydrogen source and being surrounded by a cover forming an air jacket between the metal casing of the furnace and the cover, which cover has one or more air inlets and one or more air exits, and b. means for cooling hot combustion gases, and c. means for removing at least one acid constituent from the cooled gases.

According to the process of the present invention the temperature of the metal casing of the furnace or combustion chamber should not fall below 140°C or rise above 375°C. Operation of the furnace such that the temperature of its metal casing lies between these two temperatures is of critical importance with regard to the prevention of acid corrosion of the metal casing. If the temperature of the metal casing falls below 140°C the rate of acid attack on the metal casing strongly increases due to condensation of liquid halogen acids; on the other hand if the temperature of the metal casing rises above 375°C strong acid attack is caused by the hot halogen acid-containing gases. Since the chances of severe corrosion are increased the nearer the temperature of the metal casing of the furnace approaches 140°C or 375°C the furnace is preferably operated such that the temperature of its metal casing lies between 160°C and 300°C.

The temperature of the metal casing of the furnace during operation is dictated by three factors. These are the temperatures at which the combustion is carried out, the type and thickness of refractory lining in the furnace and the ambient atmospheric conditions. With regard to the first factor, combustion may be carried out at any temperature between 600°C and 1800°C although it is preferably carried out between 1000° and 1600°C. The type and thickness of the refractory lining may vary widely although economic and practical reasons do limit the scope. The ambient atmospheric conditions prevailing at the location of the furnace play a most important part with regard to the temperature of the furnace casing. In summer the ambient temperature may be relatively high and the wind velocity relatively low while in winter the ambient temperature is cooler and the wind velocity relatively high. Clearly, the extent to which the furnace casing is cooled by these two sets of atmospheric conditions differs very widely; accordingly for a given combustion temperature and refractory lining the temperature of the furnace casing will be very much hotter in the summer conditions than in the winter conditions. From the foregoing, it is clearly apparent that a method of controlling the temperature of the metal casing of the furnace is required whereby operation within the desired temperature limits for the metal casing is achieved over a wide range of the three aforementioned factors. The present process provides a simple, reliable and economic method in which this is achieved by contacting the metal furnace casing with a fluid heat transfer medium to maintain the temperature of the metal casing between the desired temperature limits. The heat transfer fluid is either liquid or gaseous. It is derived, for example, from a liquid or gaseous process stream in a refinery or chemical plant, or it is derived from the air in the surrounding atmosphere.

In a particular embodiment of the invention the furnace is cooled by a naturally-convected upward flow of air through an air jacket, air entering the bottom of the air jacket via one or more inlets and leaving the top of the air jacket via one or more stacks. The upward flow of air through the air jacket by natural convection results from the pressure difference between the cold air at the bottom of the air jacket and the relatively hot air in the stack(s). A thermo-syphon effect of the air is therefore achieved.

The rate at which the air jacket cools the metal casing of the furnace is dictated by two factors. These are the rates at which the air flows through the air jacket and the average temperature of the air. These two factors are to a certain extent, of course, mutually dependent. The slower the flow of air through the air jacket the higher the average temperature of the air becomes and vice versa.

The rate at which the air flows through the air jacket is determined in the main by the height of the stacks used. If a high degree of cooling is required, as for instance, is necessary for operation in a hot climate, then the stack(s) should be high. If a lower degree of cooling is required the stack(s) need not be so high. The height of the stacks is, however, limited by practical considerations and preferably is not greater than 10 meters. In most cases, however, a stack height of between 0.5 and 5 meters is sufficient. The rate of airflow through the air jacket is generally not greater than 3 meters per second. More usually the air-flow rate lies between 0.1 and 2 meters per second.

A further factor which has an effect on the rate of air flow through the air jacket is the thickness of the air jacket. If the air jacket is rather thin then friction between the air and the furnace casing/air jacket cover impedes the flow of air thus reducing the air flow rate. Too thin air jackets are not therefore suitable and in general the thickness of the air jacket is greater than about 1 centimeter and is typically less than about 40 centimeters. When natural convection is employed, the air jacket is preferably greater than about 5 centimeters. There is no inherent limitation on the maximum thickness of the air jacket, but this is determined primarily by economic and engineering consideration. Generally, this maximum thickness of the air gap is less than about three meters and more preferably is less than about one meter.

In a preferred embodiment of the invention the stacks which provide the thermo-syphon effect contain valves by which the flow of air is regulated. The maximum air flow rate is, of course, determined by the height of the stack(s) but, within the range of flow rates achievable, the valves are regulated in order to achieve the flow rate required at any particular time. Hence in hot weather where substantial cooling is required the valves are substantially or even perhaps fully opened so that a large air flow is achieved. On the other hand in cold weather the valves may be almost closed so that the air flow rate through the air jacket is very small. Indeed in very cold weather the valves may be closed completely so that no air flows through the air jacket. The air jacket then acts to insulate the furnace casing from the extreme weather conditions.

It can therefore be seen that two of the main advantages of this preferred embodiment of the invention are its simplicity and its flexibility. Hence the rate of cooling of the furnace casing can be changed from day to day in order to suit the prevailing weather conditions by merely turning one or more valves, the operation of the valves being either manually or, if desired, automatically carried out. In general the valves are so adjusted that the average temperature of the air in the air jacket lies between 30° and 200°C.

The above embodiment of the invention concerns the cooling of the furnace by a naturally-convected upward flow of air through an air jacket and is preferred because, inter alia, it is simple and inexpensive. However, the occasion may arise where a high rate of cooling of the furnace is necessary, requiring a high air flow rate. In such a case it is necessary to use very high stacks if the cooling is to be carried out by natural convection. For practical reasons high stacks are not desirble and therefore it is usually advantageous to use one or more air pumps or blowers to provide cooling by forced convection in which case stacks are no longer necessary. This method of cooling the furnace casing is, of course, more expensive than the natural convection method but far higher air flow rates are possible.

In this connection air flow rates of 10 meters per second and higher are possible. Since there is far greater power availble to force the air through the air jacket, the restriction regarding the minimum thickness of the air jacket due to friction forces is no longer so severe. Hence, air jackets having a thickness of as little as 1 centimeter are possible although thickness above 2.5 centimeters are more preferred. As mentioned above, maximum air jacket thickness will be less than about 3 meters and preferably less than about 1 meter.

As has been previously discussed the temperature of the metal casing of the furnace should be kept within certain limits. In order to ensure this the temperature of the metal casing is preferably monitored so that if a significant change in temperature of the metal casing occurs the appropriate adjustment to the air flow rate through the air jacket can be made. The temperature of the metal casing is preferably monitored by means of one or more thermocouples attached to the outside of the metal casing.

The type and thickness of the refractory material used to line the furnace depend on the temperature at which the furnace is designed to operate. At low temperatures of, for instance 600° to 800°C a refractory material having a medium thermal conductivity is suitably used. Any suitable commercially-availble refractory material is used, such as, for example, alumina or silica. At higher tempertures it is necessary to provide greater insulation of the furnace casing in order to assist in maintaining the temperature of the casing below the upper temperature limit. In these cases a refractory lining consisting of a composite refractory comprising a relatively thick inner layer of a refractory material having a medium thermal conductivity and a relatively thin outer layer of a refractory material having a low thermal conductivity, the outer layer acting as an insulation between the furnace casing and the inner layer of refractory material, has been found to be very suitable. One such composite refractory material, which is used to advantage, comprises an inner layer of a silica/alumina refractory and an outer layer of a silica/calcium oxide refractory. The inner layer preferably has a thickness of between about 5 and 25 centimeters and a thermal conductivity of between about 0.65 and 0.80 kilocalories per meter-hour-degree centigrade (kcal/m.h.°C) and the outer layer preferably has a thickness of between about 1 and 5 centimeters, and a thermal conductivity of between about 0.048 and 0.068 kcal/m.h.°C.

The combustion of halogenated organic materials according to the present process is carried out under such conditions that complete combustion of the materials occurs and to such extent that the halogen content of the materials is practically completely converted to hydrogen halide vapor. In order to achieve this it is essential to ensure that at least the theoretical amount of oxygen-containing gas for complete combustion is used to combust the halogenated organic materials. Preferably, between 100 and 130 percent of the theoretical amount is used. The oxygen-containing gas may be air, oxygen or oxygen-enriched air.

The temperature of combustion must be sufficiently high to ensure complete combustion of the halogenated organic materials and, as has been mentioned previously, may vary between about 600°C and about 1800°C. Preferably, however, a temperature between about 1000°C and about 1600°C is used. In the case of halogenated organic materials which have a low calorie content an auxiliary fuel is suitably combusted therewith. Any hydrocarbon fuel is used such as, for example, propane, butane or refinery fuel gas.

If the halogenated organic material, with or without the addition of fuel, contains sufficiently large amounts of combustible hydrogen it is not necessary to introduce an additional hydrogen source during combustion. If this is not the case, then an additional hydrogen source will be required during combustion. In order to ensure that substantially all the halogen constituents are converted into halogen acids and not into free halogens the use of an excess of the hydrogen source is desirable. The hydrogen source is chosen from the group consisting of steam, water, hydrogen, gas, hydrocarbon gas and mixtures thereof. Water is the preferred hydrogen source since not only does it influence the reaction equilibria to promote the formation of halogen acids and not free halogens, but it also assists in controlling excessive temperatures in the furnace which might otherwise occur.

Any halogenated organic material is combusted according to the present process. In general, however, the halogen component of these materials will be chlorine, and, for example, typical chlorinated derivatives of methane, ethane, propane, ethylene, acetylene, butylene and benzene are suitably combusted.

The cooling of the hot combustion gases is carried out in conventional manner. Preferably, however, the cooling is effected by quenching the gases with an aqueous liquid. This has the advantage that a certain amount of the halogen acid(s) present in the hot gases is removed during cooling by absorption in the aqueous liquid. The amount of halogen acid(s) which is required to be removed in the subsequent acid removal facilities is thereby reduced. The quenching of the hot gases is carried out in any suitable manner, such as, for example, by injecting them directly into an aqueous liquid in a vessel, or again by countercurrently contacting the gases with an aqueous liquid in one or more scrubbers. A further method by which the hot gases are quenched is to pass them through a substantially vertical elongated tube which is directly connected to the bottom of the furnace and into which a cool aqueous liquid is introduced such that a continuous liquid film flows down the inner wall there. The preferred aqueous liquid is water or a dilute acid solution in water.

The removal of acid constituent(s) from the cooled gases is carried out by any known method as, for example, by countercurrently scrubbing them with a dilute alkali solution in one or more scrubbers.

The invention is practical in various ways and some specific embodiments are further elucidated with reference to the Figures in which accessories such as valves, pumps, control instruments and the like are not shown for purposes of clarity.

Figure 2:
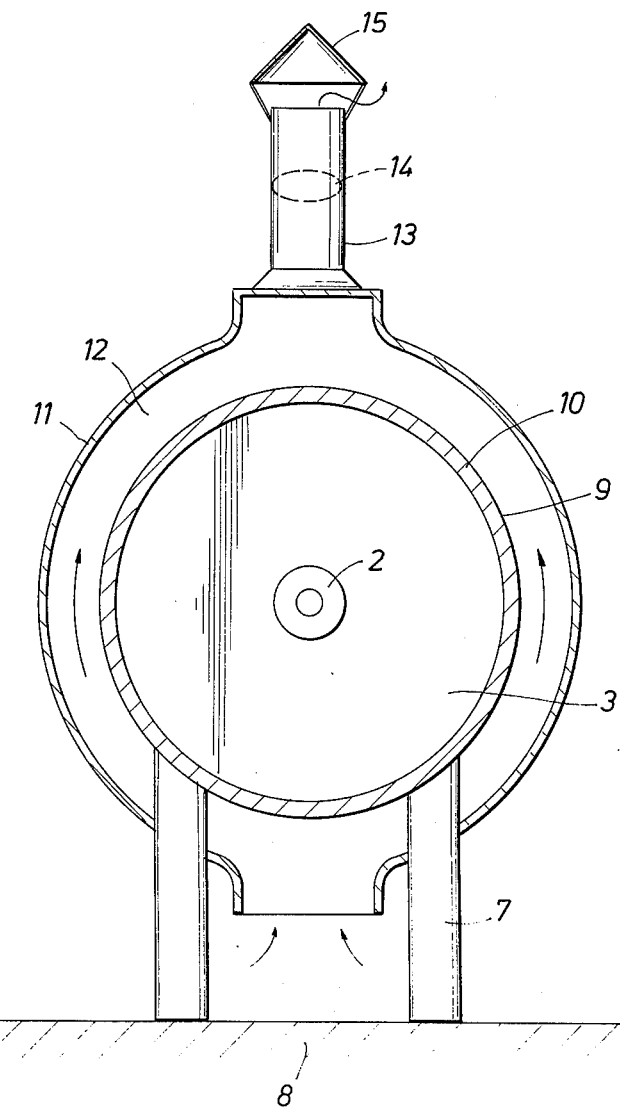
FIG. 2 shows an enlarged partial view at section 2-2 of FIG. 1 of the combustion furnace.

FIG. 1 is a flow scheme of a process according to the present invention in which halogenated organic material is suitably disposed of. FIG. 2 is a cross sectional view of the furnace represented in FIG. 1 taken on the line 2—2.

With regard to FIG. 1 a chlorinated organic material is passed via a line 1 and a burner 2 into a furnace 3 in which the material is combusted in the presence of fuel, air and steam which are introduced to the furnace via lines 4, 5 and 6 respectively. The furnace is supported by legs 7 resting on the ground 8. The metal furnace casing 9 is lined with a refractory material 10 and surrounded with a metal cover 11 forming an air jacket 12 around the furnace casing. Cooling air enters the air jacket at the bottom of the cover via a duct which runs along the entire length of the base of the cover, flows through the air jacket and passes out of the air jacket through stacks 13. Each stack has a valve 14 for controlling the flow of air through the air jacket and also is provided with a weather protection cover 15. The temperature of the metal furnace casing is monitored by thermocouples attached to the outside of the casing (not shown in the diagram).

The hot combustion gases pass out of the furnace via a line 16 and into the bottom of a scrubber 17. The gases are cooled by passing them up the scrubber in countercurrent flow to water which is introduced via a line 18. Hot halogen acid solution passes out of the scrubber via a line 19 and is recovered. A part of this acid solution if desired is recycled to the top of the scrubber after being cooled (not shown in the FIG.). Cooled gases having a substantially reduced halogen acid content pass out of the scrubber via a line 20 and pass into an alkaline scrubber 21 in order to remove the remaining halogen acid constituents. Alkali solution passes into this scrubber via a line 22 and, after absorbing substantially all the acidic constituents of the gases to which it passes countercurrently, passes out via a line 23. Part of the alkali solution leaving the scrubber via line 23 is recycled to the top of the scrubber via line 24. Cool substantially acid-free gases pass via line 25 into the atmosphere.

FIG. 2 shows a cross sectional view of the furnace depicted in FIG. 1, taken on line 2—2. The chlorinated organic material passes into furnace 3 by means of burner 2. The furnace is supported by legs 7 resting on the ground 8. The metal furnace casing 9 is lined with a refractory material 10 and surrounded with a metal cover 11 forming an air jacket 12 around the furnace casing. Cooling air enters the air jacket at the bottom of the cover, flows through the air jacket and passes out of the air jacket through stack 13. Each stack has a valve 14 for controlling the flow of air through the air jacket and also is provided with a weather protection cover 15.

The following example will further elucidate the invention. The process and apparatus according to the present invention was used to dispose of hexachloroethane. This material was combusted together with air fuel and steam in a cylindrical furnace having the following physical characteristics:

| | | |
|---|---|---|
| Length of furnace | 4.7 | meters |
| Diameter of furnace | 3.3 | meters |
| Type and thickness of inner refractory | 14.0 | centimeters of a silica/alumina refractory |
| Type and thickness of outer refractory | 5.0 | centimeters of a silica/calcium oxide refractory |
| Thickness of mild steep furnace casing | 1.0 | centimeter |
| Thickness of air jacket | 20.0 | centimeters |
| Number and height of stacks | 3 of 1.6 | meters |

The combustion of the hexachloroethane was carried out at a furnace temperature of 1100°C for a period of 52 weeks during which the ambient temperature varied from −10°C to 30°C. During this time the flow of air passing through the air jacket was adjusted according to the ambient temperature and varied between a minimum of 0.25 meters/second to a maximum of 5 meters/second. The average temperature of the air in the air jacket varied between 35°C and 120°C. The temperature of the mild steel furnace casing was found to vary between 165°C and 225°C during the 52-week period, i.e., well within the limits within which it is safe to operate.

The cooling and acid removal facilities used during the 52-week period consisted of a water scrubber and a dilute alkali scrubber, the former cooling the gases from 1100°C to 50°C and also removing a large part of the acid constituents and the latter removing substantially all the remaining acid constituents. Acid solution was recovered from both scrubbers and cool, substantially acid-free gases passed out of the second scrubber into the atmosphere.

What we claim is:

1. In the apparatus for combusting halogenated organic materials wherein the temperature of combustion ranges from about 600°C to about 1800°C comprising
   a. a refractory-lined metal furnace having at least one inlet for the introduction of halogenated organic material, oxygen-containing gas and fuel and/or hydrogen source
   b. means for cooling hot combustion gases, and
   c. means for removing at least one acid constituent from the cooled gases, the improvement which consists of a cover surrounding the furnace and forming an air jacket between the metal casing of the furnace and the cover said cover having on the bottom at least one air inlet and on the top at least one stack as an air exit, the distance between the metal casing of the furnace and the cover and the number and size of the inlets and stacks being such that the temperature of the metal casing of the furnace is held by a flow of air between about 140°C and about 375°C.

2. The apparatus in claim 1 in which the stacks are provided with valves for regulating the air through the air jacket.

3. The apparatus in claim 1 in which the height of the stacks is not more than 10 meters.

4. The apparatus in claim 1 in which the distance between the metal casing of the furnace and the cover is at least 2.5 centimeters.

* * * * *